United States Patent [19]

Chiok

[11] Patent Number: 5,303,048
[45] Date of Patent: Apr. 12, 1994

[54] CIRCUIT FOR SYNCHRONIZING AN ON-SCREEN DISPLAY (OSD) ON A PICTURE SCREEN

[75] Inventor: Huan S. Chiok, Singapore, Singapore

[73] Assignee: Thomson Consumer Electronics S.A., Courbevoie, France

[21] Appl. No.: 37,625

[22] Filed: Mar. 25, 1993

[30] Foreign Application Priority Data

Mar. 25, 1992 [EP] European Pat. Off. ........ 92400814.7

[51] Int. Cl.$^5$ ............................................. H04N 5/272
[52] U.S. Cl. ................................. 348/607; 348/578; 348/553
[58] Field of Search ................. 358/183, 22, 181, 172, 358/160, 21 R; H04N 5/272, 5/45, 5/262

[56] References Cited

U.S. PATENT DOCUMENTS

| | | | |
|---|---|---|---|
| 4,291,336 | 9/1981 | Shanley, II | 358/160 |
| 4,354,202 | 10/1982 | Harlan | 358/183 |
| 4,475,124 | 10/1984 | Ankeny et al. | 358/183 |
| 4,612,577 | 9/1986 | Keen | 358/172 |

FOREIGN PATENT DOCUMENTS 2218897 9/1993 Fed. Rep. of Germany .
2155713A 9/1985 United Kingdom .

OTHER PUBLICATIONS

Patent Abstract of Japan 40 54 772.
"Picture in Picture" by M. Bromba, et al., Siemens Components, vol. 25, No. 1, Mar. 1990, pp. 17-21.

Primary Examiner—Victor Kostak
Assistant Examiner—Nathan J. Flynn
Attorney, Agent, or Firm—Joseph S. Tripoli; Peter M. Emanuel; Richard G. Coalter

[57] ABSTRACT

In a television receiver, a source of super sandcastle pulse is connected via a horizontal sync signal extracting first circuit and the vertical sync signal extracting second circuit to the horizontal and vertical sync input terminals of an OSD processor. Advantageously, it has been found that such a super sandcastle pulse provides good and stable relationship between H and V so that flicker and jitter on the screen during OSD do not occur.

2 Claims, 1 Drawing Sheet

CIRCUIT FOR SYNCHRONIZING AN ON-SCREEN DISPLAY (OSD) ON A PICTURE SCREEN

FIELD OF THE INVENTION

This invention relates to television apparatus and particularly to circuitry for synchronizing an "on screen display" (hereafter, "OSD") video processor with a picture representative video signal.

BACKGROUND OF THE INVENTION

When displaying character or other on-screen display symbols on the screen of a television receiver or monitor, it is necessary that the OSD micro processor be properly synchronized with the horizontal and vertical synchronizing components of the video signal being displayed. Generally speaking, this synchronization is achieved by deriving horizontal synchronizing pulses from the line deflection circuitry of the receiver or from the heater voltage for the picture tube. Typically, vertical synchronization pulses for OSD use are derived from the vertical flyback pulse of the receiver vertical deflection system.

Generally speaking, the foregoing method of OSD synchronization gives adequate performance under most operating conditions. However, under some circumstances (e.g., poor signal to noise, or deflection instabilities), the conventional technique of OSD synchronization may produce erratic results due to instabilities in the deflection horizontal and vertical synchronizing signals and, as a result, displayed characters may exhibit jitter or other instabilities.

SUMMARY OF THE INVENTION

The present invention resides, in part, in recognizing the need for improvement in OSD synchronization to reduce effects such as flicker and jitter within displayed characters. The present invention also resides, in a further part, of meeting the foregoing need in a relatively cost efficient manner without requiring complex circuitry while utilizing, as much as possible, existing timing signals within the receiver other than the aforementioned deflection generated timing signals.

In accordance with an aspect of the invention, a source of super sandcastle pulse is connected via a horizontal sync signal extracting first circuit and the vertical sync signal extracting second circuit to the horizontal and vertical sync input terminals of an OSD processor. Advantageously, it has been found that such a super sandcastle pulse (which is generally available within a television, receiver at the output of an integrated circuit) provides good and stable relationship between H and V so that flicker and jitter on the screen during OSD do not occur.

A further advantage is that the circuit for realizing the invention is rather simple as compared, for example, with phase lock loop stabilization techniques. More specifically, implementation of the present invention requires only a pair of relatively simple circuits for extracting the H pulse and the V pulse from the super sandcastle pulse which includes both pulses H and V.

BRIEF DESCRIPTION OF THE DRAWING

The foregoing and further features of the invention are illustrated in the drawing, wherein.

DETAILED DESCRIPTION

Figure 1:
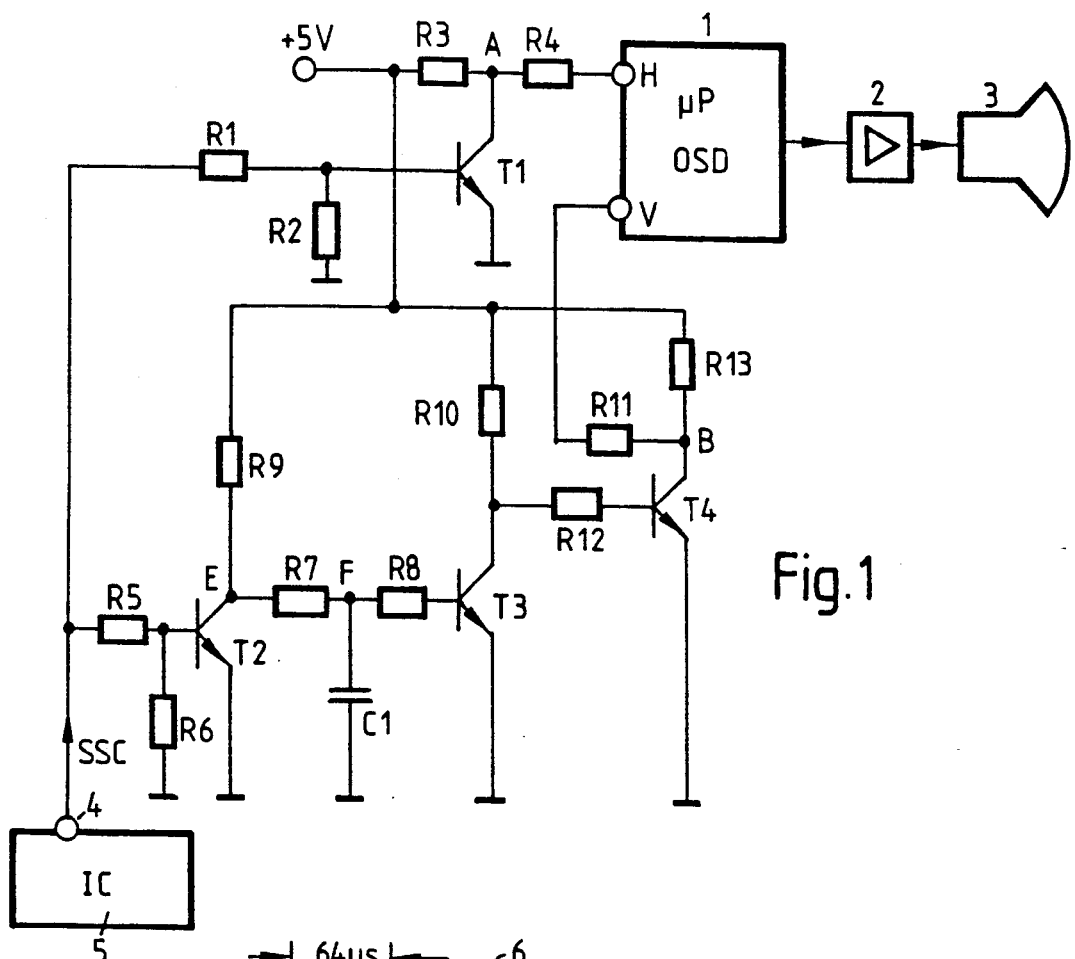
FIG. 1 is a detailed schematic diagram, partially in block form, of on-screen display synchronizing circuitry embodying the invention in a television receiver.

In FIG. 1 an OSD micro-processor 1 is provided which controls via amplifier 2 cathode-ray-tube (CRT) 3 for OSD. Microprocessor 1 provides signals generating characters, symbols and the like on the screen of the picture tube 3. OSD processor 1 has a horizontal sync input terminal H and a vertical sync input terminal V for synchronizing OSD.

Figure 2:
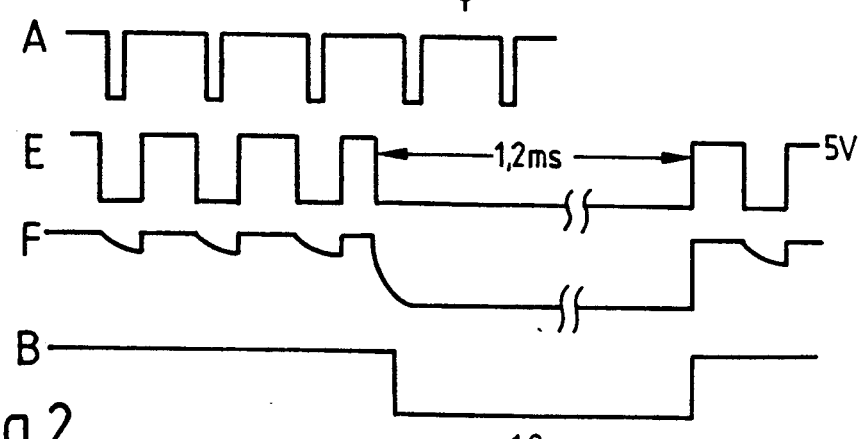
FIG. 2 is a waveform diagram illustrating operation of the receiver of FIG. 1.

For synchronization of processor I a super sandcastle pulse SSC is derived from output terminal 4 of an integrated circuit 5. The "super" sandcastle pulse SSC is shown in FIG. 2 where it is seen to have three levels, namely, sync tip, horizontal blanking and vertical blanking levels. The pulse SSC is fed via resistors R1, R2 to base of a transistor T1 the collector of which is connected to +5 V via a resistor R3 and to terminal H via a resistor R4. The T1 circuit is so dimensioned and biased that only the short positive pulses 6 of pulse SSC turn on transistor T1 so that waveform A is established at the collector and fed to a horizontal sync input terminal H of processor 1.

Pulse SSC is fed additionally via resistor R5 and R6 to base of transistor T2. This transistor circuit is dimensioned biased in such a way that transistor T2 is turned on during pulse SSC being between 0 and 3 volts. A transistor T2 has a function of limiting amplifier so that voltage E appears at collector of T2. During the vertical sync pulse V pulse SSC does not come below 3 volts so that during this time transistor T2 remains in an "on" condition and voltage E remains zero. By integrating RC network R7, C1 connected to collector of T2 voltage in F is formed and fed via resistor R8 to a base of T3. During vertical forward period said voltage F does not decrease by such an amount that the following circuit T3, T4 is triggered. However, during vertical sync pulse due to pulse E a voltage F further decreases so that the following circuit is activated and vertical sync pulse B is produced and fed to vertical sync input terminal V of OSD processor 1. Transistor T3 is used to shape the waveform for better rise time and fall time and transistor T4 is used to get the correct phase for a pulse B for OSD processor 1.

Within a circuit experimentally tested the elements shown had the following values.

| | | | |
|---|---|---|---|
| R1 | 86K | R2 | 5K |
| R3 | 6K | R4 | 10K |
| R5 | 47K | R6 | 47K |
| R7 | 10K | R8 | 10K |
| R9 | 10K | R10 | 6K |
| R11 | 10K | R12 | 10K |
| R13 | 6K | | |

What is claimed is:

1. A circuit for synchronizing an On-Screen-Display (OSD) on a picture screen within a television device including an OSD processor having horizontal and vertical sync input terminals, characterized in that a source of super sandcastle pulse (SSC) is connected via a horizontal sync signal extracting first circuit and a vertical sync signal extracting second circuit to said horizontal and vertical sync input terminals of said OSD processor and wherein:

said second circuit includes an RC-integration network and a subsequent threshold circuit having such a bias that vertical sync pluses only are produced at the output.

2. A circuit for synchronizing an On-Screen-Display (OSD) on a picture screen within a television device including an OSD processor having horizontal and vertical sync input terminals, characterized in that a source of super sandcastle pulse (SSC) is connected via a horizontal sync signal extracting first circuit and a vertical sync signal extracting second circuit to said horizontal and vertical sync input terminals of said OSD processor and wherein:

said second circuit includes an RC-integration network and a subsequent threshold circuit having such a bias that vertical sync pulses only are produced at the output; and a limiting amplifier fed by the super sandcastle pulse, a subsequent RC-integration circuit, a subsequent threshold circuit and a subsequent pulse forms the output of which being connected to the vertical sync input terminal of the OSD processor.

* * * * *